United States Patent
Yalcin et al.

(10) Patent No.: US 12,006,794 B1
(45) Date of Patent: Jun. 11, 2024

(54) THERMOCHEMICAL FLUID INJECTION TO PREVENT COOL FRONT INVASION IN $CO_2$ GEOTHERMAL RESERVOIRS

(71) Applicant: SAUDI ARABIAN OIL COMPANY, Dhahran (SA)

(72) Inventors: Bora Yalcin, Thuwal (SA); Zuhair AlYousef, Saihat (SA); Abdulaziz S. Al-Qasim, Dammam (SA); Subhash C. Ayirala, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/180,530

(22) Filed: Mar. 8, 2023

(51) Int. Cl.
*E21B 36/00* (2006.01)
*C09K 8/05* (2006.01)
*C09K 8/594* (2006.01)
*F24T 50/00* (2018.01)

(52) U.S. Cl.
CPC .............. *E21B 36/008* (2013.01); *C09K 8/05* (2013.01); *C09K 8/594* (2013.01); *F24T 50/00* (2018.05)

(58) Field of Classification Search
CPC .......... E21B 36/008; F24T 50/00; C09K 8/05; C09K 8/594
See application file for complete search history.

(56) References Cited

U.S. PATENT DOCUMENTS

| | | |
|---|---|---|
| 5,183,581 A | 2/1993 | Khalil et al. |
| 5,891,262 A | 4/1999 | Khalil et al. |
| 8,962,536 B2 | 2/2015 | Winslow et al. |
| 9,701,894 B2 * | 7/2017 | Al-Nakhli ................. C09K 8/80 |
| 9,803,133 B2 | 10/2017 | Al-Nakhli et al. |
| 11,215,043 B2 | 1/2022 | Al-Nakhli et al. |
| 2011/0186292 A1 * | 8/2011 | Wheeler ................ E21B 43/164 |
| | | 166/272.3 |
| 2016/0187031 A1 | 6/2016 | McBay |
| 2017/0015893 A1 * | 1/2017 | Al-Yousef ................. C09K 8/80 |
| 2021/0363866 A1 * | 11/2021 | Al-Nakhli ............... C09K 8/665 |
| 2021/0380869 A1 * | 12/2021 | Al-Taq ..................... E21B 43/24 |
| 2022/0412197 A1 * | 12/2022 | AlYousef .............. E21B 43/164 |

FOREIGN PATENT DOCUMENTS

| | | |
|---|---|---|
| CN | 106350050 A | 1/2017 |
| CN | 104675360 B | 3/2017 |
| CN | 107011873 B | 12/2019 |

OTHER PUBLICATIONS

Akinfiev et al., "Thermodynamic description of H2S—H2O—NaCl solutions at temperatures to 573 K and pressures to 40 MPa," Chemical Geology, Jan. 14, 2016, 424 (2016) 1-11, 11 pages.
Alade et al., "Evaluation of Kinetics and Energetics of Thermochemical Fluids for Enhanced Recovery of Heavy Oil and Liquid Condensate," Energy & Fuels, Apr. 30, 2019, 27 pages.
Dong et al., "Laboratory Experimental Research on Promoting Aquathermolysis of Heavy Oil with the NaNO2/NH4Cl Exothermic System," Advanced Materials Research vol. 772 (2013) pp. 297-302, Sep. 4, 2013, 7 pages.
Ezekiel et al., "Numerical analysis and optimization of the performance of CO2-Plume Geothermal (CPG production wells and implications for electric power generation," Geothermics, Oct. 17, 2021, 98 (2022 102270, 16 pages.
Hassan et al., "Condensate-Banking Removal and Gas-Production Enhancement Using Thermochemical Injection: A Field-Scale Simulation," Processes 8.6 Jun. 23, 2020, 727, 18 pages.
Mesquita et al., "Evaluation of CO2 as an Acid Catalyst Precursor for Promoting a Nitrogen-Generating System," Society of Petroleum Engineers, SPE-209613-PA, Aug. 11, 2022, 9 pages.
Mousa et al., "Well-Placement Optimization in Heavy Oil Reservoirs Using a Novel Method of In Situ Steam Generation," Journal of Energy Resources Technology, Oct. 24, 2018, 10 pages.
Spycher et al., "A Phase-Partitioning Model for CO2-Brine Mixtures at Elevated Temperatures and Pressures: Application to CO2-Enhanced Geothermal Systems," Transport in porous media, Jul. 17, 2009, 82(1), pp. 173-196, 24 pages.
Xiuyu et al., "Improved kinetic Equations for a NaNO2/NH4Cl Heat Generating System and their Implications in Oil Production," Chemistry and Technology of Fuels and Oils, vol. 55, No. 5, Nov. 2019, 12 pages.
Zhang et al., "Modeling of fate and transport of coinjection of H2S with CO2 in deep saline formations," Journal of Geophysical Research, vol. 116, B02202, Feb. 8, 2011, 13 pages.

* cited by examiner

*Primary Examiner* — Silvana C Runyan
(74) *Attorney, Agent, or Firm* — Osha Bergman Watanabe & Burton LLP

(57) ABSTRACT

A method of enhancing heat transfer and energy efficiency in a geothermal reservoir includes injecting a carbonated fluid to the reservoir, injecting a first salt solution and a second salt solution into the reservoir, and increasing the temperature of the reservoir by reacting the first salt solution with the second salt solution to provide heat. The carbonated fluid injection decreases a temperature of the reservoir. The second salt solution is reactive with the first salt solution under the conditions in the reservoir after the injecting. A system of enhancing heat transfer and energy efficiency in a geothermal reservoir includes an injection system in fluid communication with an injection well. The injection system is configured to alternate the injection of the carbonated fluid and the first salt solution and second salt solution.

19 Claims, 2 Drawing Sheets

THERMOCHEMICAL FLUID INJECTION TO PREVENT COOL FRONT INVASION IN $CO_2$ GEOTHERMAL RESERVOIRS

BACKGROUND

Various technologies involving renewable resources, carbon capture and storage, and hydrogen energy production are potentially useful for reducing emissions of greenhouse gases. One of these technologies is the harvesting of geothermal energy from subterranean formations, where heat from a subterranean formation is harvested for energy. Geothermal energy is generally sustainable and produces fewer greenhouse gas emissions than many other common energy sources.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of enhancing heat transfer and energy efficiency in a geothermal reservoir. The method includes injecting a carbonated fluid to the reservoir, injecting a first salt solution and a second salt solution into the reservoir, and increasing the temperature of the reservoir by reacting the first salt solution with the second salt solution to provide heat. The carbonated fluid injection decreases a temperature of the reservoir. The second salt solution is reactive with the first salt solution under the conditions in the reservoir after the injecting.

In another aspect, embodiments disclosed herein relate to a system for enhancing thermal energy of a geothermal reservoir. The system includes an injection system in fluid communication with an injection well, wherein the injection well is in fluid communication with a production well, wherein the injection well and the production well are disposed in the same geologic formation or in different geologic formations. The injection system includes a carbonated fluid feed inlet, a first salt solution feed inlet, and a second salt solution feed inlet. The second salt solution is capable of reaction with the first salt solution upon contact under injection conditions and under conditions in the geothermal reservoir, and the injection system is configured to alternate the injection of the carbonated fluid and the first salt solution and second salt solution.

Other aspects and advantages of the claimed subject matter will be apparent from the following description and the appended claims.

DETAILED DESCRIPTION

Figure 1:
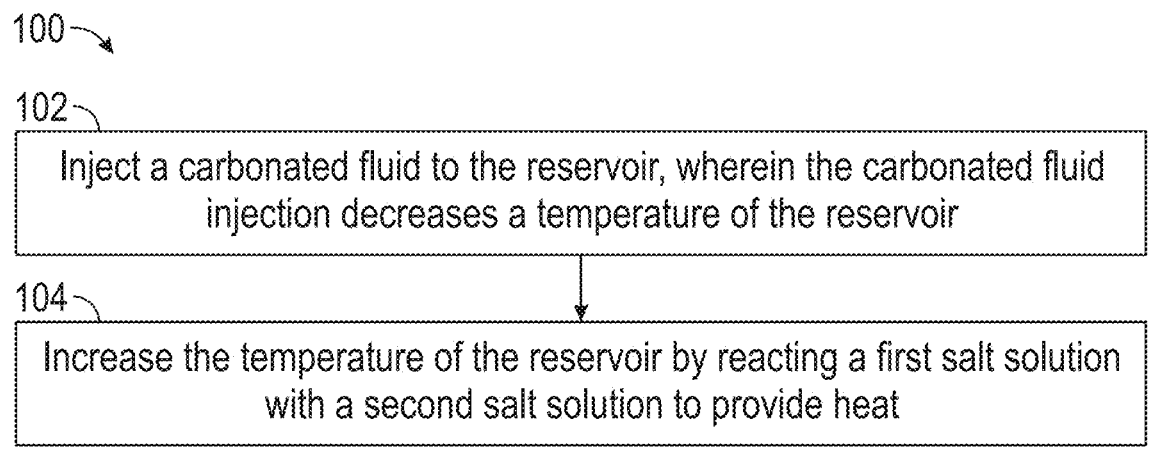
FIG. 1 is a block flow diagram for a method of enhancing heat transfer and energy efficiency in a geothermal reservoir according to one or more embodiments.

Geothermal energy is an important renewable energy source because geothermal energy can provide both baseload power and dispatchable power, such as baseload electricity and dispatchable electricity. During normal oil and gas production, the thermal energy of crude oil, liquid condensate, or natural gas is rarely exploited for energy production; rather, produced hydrocarbons are permitted to retain the heat from their natural environment to maintain a reduced fluid viscosity. As the produced hydrocarbons cool during transport from the production well, their viscosity often increases substantially.

The use of carbon dioxide ($CO_2$) as a subsurface working fluid for extracting geothermal energy has recently been proposed. The use of $CO_2$ to treat geothermal reservoirs can be applied to naturally porous and permeable formations that typically do not require hydraulic stimulation, such as deep saline aquifers (DSA). With the use of $CO_2$ as a subsurface heat extracting medium, the efficiency of electricity generation approximately doubles compared to using traditional groundwater and/or brine for geothermal energy extraction. In this manner, low and medium enthalpy geothermal reservoirs can be treated by employing $CO_2$, such as supercritical $CO_2$, as the subsurface working fluid.

However, using $CO_2$ in enhanced geothermal systems presents several challenges. In particular, injecting $CO_2$ can introduce a cold front (or "cold $CO_2$ plume") to a geothermal reservoir. For example, a hot saline aquifer has limited heat capacity, and excessive injection of cold and/or supercritical $CO_2$ can impede on the ability of the geothermal reservoir, such as an aquifer, to transfer heat. In addition, a cold $CO_2$ plume will break through the production well during later stages of field development. As such, the recovery of thermal energy will be impacted and can be stopped altogether.

The treatment methods and systems of one or more embodiments may include controlling and/or maintaining a temperature of a geothermal reservoir with the injection of a carbonated fluid, such as supercritical $CO_2$. In one or more embodiments, methods, systems, and compositions of the present disclosure provide more efficient harvesting of thermal energy of geothermal reservoirs when compared to traditional $CO_2$ injection methods for treating a geothermal reservoir.

Geothermal Treatment System

One or more embodiments presented herein relate to a geothermal treatment system. The geothermal treatment system may include an injection system that includes a carbonated fluid feed inlet, a first salt solution feed inlet, and a second salt solution feed inlet. The injection system of one or more embodiments includes a plurality of inlets for injecting a carbonated fluid, a first salt solution, and a second salt solution. In one or more embodiments, the carbonated fluid includes a source of $CO_2$. In some embodiments, the source of $CO_2$ includes supercritical $CO_2$. The source of $CO_2$ may be $CO_2$ that has been captured and compressed. The source of $CO_2$ may be dissolved in a carrier fluid to provide the carbonated fluid.

In one or more embodiments, the geothermal treatment system includes an injection system. In one or more embodiments, the injection system is in fluid communication with an injection well, wherein the injection well is in fluid communication with a production well, such as via a hydraulic connection. In one or more embodiments, the injection system is in fluid communication with an injection well, wherein the injection well is in thermal communication with a production well. In one or more particular embodiments, the injection well and the production well are disposed in the same geologic formation or in different geologic formations. In one or more embodiments, the injection system includes one or more modelling units to model downhole conditions.

In one or more embodiments, the injection system is configured to deliver a carbonated fluid, a first salt solution, and a second salt solution to the reservoir via one or more fluid transport lines. In such embodiments, the injection system is configured to inject the carbonated fluid prior to injection of the first salt solution and the second salt solution. The one or more fluid transport lines may be independently disposed in the wellbore annulus of the injection well. The one or more fluid transport lines may transport one or more fluids from a surface location of the formation to a downhole location of the formation. For example, the one or more fluid transport lines may include at least one coiled tubing. As such, the carbonated fluid, the first salt solution, the second salt solution, or combinations thereof may be delivered downhole via the at least one coiled tubing.

The first salt solution, the second salt solution, and the carbonated fluid may be independently injected into the reservoir via the injection well in the form of a pill. As one of ordinary skill may appreciate, the term "pill" may refer to a quantity of less than 200 bbl, where 1 bbl is 42 gallons per cubic meter, of a task-specific fluid different from a traditional drilling fluid. In one or more embodiments, the injection system is configured to inject the carbonated fluid, the first salt solution, and the second salt solution are injected sequentially into the formation in the form of a pill.

In one or more embodiments, the injection system is configured to deliver the first salt solution and the second salt solution to the formation via serial injection of a first salt solution and a second salt solution. In one or more embodiments, the injection system is configured to deliver the first salt solution and the second salt solution to the formation via separate injection of a first salt solution and a second salt solution. The injection system may be configured to separately inject the first salt solution and the second salt solution, where the second salt solution is capable of reaction with the first salt solution upon contact, under injection conditions, under conditions in the reservoir, or combinations thereof.

The injection system may be configured to deliver a first salt solution and a second salt solution simultaneously to the reservoir via separate fluid transport lines. For example, the injection system may be configured to deliver a first salt solution to the formation via a first fluid transport line and deliver a second salt solution composition to the formation via a second fluid transport line.

In one or more embodiments, the injection system is configured to inject one or more fluids to achieve a target temperature in the geothermal formation. In one or more embodiments, the injection system includes one or more modelling units to model downhole conditions, one or more bottom hole temperature sensors included in the wellbore of the injection well, or both. The injection system may be configured to deliver the carbonated fluid separately to the formation via a third fluid transport line. In some embodiments, the carbonated fluid is delivered to the formation via a third fluid transport line or the first fluid transport line prior to the injection of the first salt solution and the second salt solution.

In some embodiments, the carbonated fluid may be delivered in parallel with the first salt solution, the second salt solution, or both. In such embodiments, reacting the thermogenic mixture may promote the distribution of $CO_2$ into the geothermal formation while also providing thermal energy to the formation. In some embodiments, the injection system may be configured to deliver the carbonated fluid composition with a first salt solution to the formation via the first fluid transport line.

In one or more embodiments, the geothermal system includes one or more production units to harvest thermal energy. In some embodiments, the carbonated fluid may be injected into an injection well of a geothermal system and produced at a production well. As such, thermal energy may be transferred from the geothermal reservoir to the injected carbonated fluid to form a geothermally heated carbonated fluid, which may then be produced at the production well. As such, thermal energy may be transferred, via convection and conduction phenomena, from the geothermal reservoir to the injected carbonated fluid to form a geothermally heated carbonated fluid, which may then be produced at the production well. After the geothermally heated carbonate fluid is recovered, the geothermally heated carbonate fluid may be run through one or more turbines to generate electric energy. The one or more turbines may be located at a surface location proximate to the one or more production wells.

Supporting equipment for embodiments of the formation treatment system, injection system, or both may include additional standard components or equipment that enables and makes operable the described apparatuses, processes, methods, systems, and compositions of matter. Examples of such standard equipment known to one of ordinary skill in the art includes, but are not limited to, heat exchanges, blowers, single and multi-stage compressors and pumps, separation equipment, manual and automated control and isolation valves, switches, analogue and computer-based controllers, and pressure-, temperature-, level-flow-, and other-sensing devices.

In one or more embodiments, the injection system may include $CO_2$ dissolved in a sufficient amount of a carrier fluid such that the gas is completely dissolved. The $CO_2$ may be dissolved in a sufficient amount of carrier fluid to maximize a geothermal reservoir sweep efficiency via maximization of $CO_2$ release from the carbonated fluid at reservoir conditions. In one or more embodiments, the amount of $CO_2$ dissolved in the carrier fluid may be dependent upon formation parameters, such as a temperature and/or pressure of the geothermal reservoir, and the desired task. In one or more embodiments, the carbonated fluid is supercritical $CO_2$.

In one or more embodiments, the carrier fluid includes a water-based fluid. The water-based fluid may be distilled water, brine, deionized water, tap water, fresh water from surface or subsurface sources, formation water produced from the structural low, formation water produced from a different geologic formation, production water, frac or flowback water, natural and synthetic brines, residual brine from desalination processing, a regional water source, such as fresh water, brackish water, natural and synthetic sea water, potable water, non-potable water, ground water, seawater, other waters, and combinations thereof, that are suitable for use in a wellbore environment. In one or more embodiments, the water used may naturally contain contaminants, such as salts, ions, minerals, organics, and combinations thereof, as long as the contaminants do not interfere with the release of $CO_2$ from the carbonated fluid, a thermogenic reaction, or both. In one or more embodiments, the water-based fluid includes additives such as viscosifiers, polymers, surfactants, pH balancers, or combinations thereof.

The carbonated fluid of one or more embodiments may include other additives provided the additives do not interfere with the use of $CO_2$ to enhance thermal energy harvesting from the geothermal reservoir, a thermogenic reaction, or both. Such additives may include, for instance, one or more wetting agents, corrosion inhibitors, biocides, surfactants, dispersants, interfacial tension reducers, mutual solvents, and thinning agents. The identities and use of the aforementioned additives are not particularly limited. One of ordinary skill in the art will, with the benefit of this disclosure, appreciate that the inclusion of a particular additive will depend upon the stage of reservoir operations, desired application, and properties of a given wellbore fluid.

The first salt solution may include a first thermogenic agent dissolved in a first aqueous fluid. The first thermogenic agent may be an ammonium-based compound. The ammonium-based compound may be an ammonium salt. For example, in some embodiments the ammonium containing compound may be ammonium chloride ($NH_4Cl$), ammonium bromide ($NH_4Br$), ammonium nitrate ($NH_4NO_3$), ammonium nitrite ($NH_4NO_2$), ammonium sulfate (($NH_4)_2SO_4$), ammonium carbonate (($NH_4)_2CO_3$), ammonium hydroxide ($NH_4OH$), or combinations of these. In one or more embodiments, the first aqueous fluid may be a water-based solution similar to the carrier fluid as described above.

In one or more embodiments, the first salt solution may also include an acid. A variety of acids may be used. In one or more embodiments, the acid is selected from the group consisting of hydrochloric acid (HCl), hydrofluoric acid (HF), acetic acid ($CH_3COOH$), formic acid (HCOOH), and combinations thereof.

The second salt solution may include a second thermogenic agent dissolved in a second aqueous fluid. In one or more embodiments, the second aqueous fluid is a water-based fluid similar to the carrier fluid as described above. In one or more embodiments, the second thermogenic agent is a nitrite-based compound, such as a nitrite salt. For example, in some embodiments the nitrite-based compound may be selected from the group consisting of sodium nitrite ($NaNO_2$), potassium nitrite ($KNO_2$), sodium hypochlorite (NaClO), and combinations thereof. In some embodiments, the second salt solution composition is substantially free of acid. Acid present in the second salt solution may result in undesirable nitric oxide and other side product generation when the acid is mixed with the nitrite-based compound. Accordingly, as used in the present disclosure, "substantially free" means that the second solution includes less than 5% by volume, less than 4% by volume, less than 3% by volume, less than 2% by volume, less than 1% by volume, or less than 0.1% by volume of an acid.

In one or more embodiments, the ammonium-based compound and the nitrite-based compound may independently range in concentration in the first salt solution and the second salt solution, respectively. The independent concentrations may be in a range with a lower limit of one of about 1 M (Molar), about 1.5 M, about 2.0 M, about 2.5 M, about 3.0 M, about 3.5 M, about 4.0 M, and about 5.0 M with an upper limit of one of about 2.0 M, about 3.0 M, about 4.0 M, about 5.0 M, and about 6 M, where a value of the lower limit may be paired with a mathematically compatible value of the upper limit.

In one or more embodiments, the molar ratio of the nitrite-based compound of the second salt solution composition to the ammonium-based compound introduced to the subterranean formation may be from 1:1 to 3:1. For example, in some embodiments the molar ratio of $NaNO_2$ to $NH_4Cl$ introduced to the subterranean formation may be from 1:1 to 3:1; from 1.5:1 to 3:1; from 2:1 to 3:1; from 2.5:1 to 3:1; from 1:1 to 2.5:1; from 1:1 to 2:1; from 1:1 to 1.5:1; from 1.5:1 to 2.5:1; from 1.5:1 to 2:1; or from 2:1 to 2.5:1.

In one or more embodiments, a greater molar ratio of nitrite-based compound relative to ammonium-based compound allows for an increased thermogenic reaction rate. For example, a $NaNO_2$ to $NH_4Cl$ molar ratio of at least 2:1 may allow for an increased reaction rate of the first salt solution composition and the second salt solution composition compared to a $NaNO_2$ to $NH_4Cl$ molar ratio of less than 2:1. In one or more embodiments, a trigger may be present to initiate a thermogenic reaction for a first salt solution and second salt solution with a molar ratio of $NaNO_2$ to $NH_4Cl$ molar ratio of less than 2:1. The trigger may include a fluid with a pH of 4.0 or less, heat with a temperature of 60° C. or more, or combinations thereof.

In one or more embodiments, the concentration and/or molar ratio of the nitrite-based compound of the second salt solution composition to the ammonium-based compound depends on a desired amount of heat generation from a reaction between the ammonium-based compound and the nitrite-based compound. For example, a desired amount of heat released may relate to an increase in temperature from about 70° F. to about 600° F. In one or more embodiments, the increase in temperature is in a range with a lower limit of one of about 70° F., about 80° F., about 90° F., about 100° F., about 150° F., about 200° F., about 250° F., about 300° F., about 350° F., about 400° F., and about 450° F. and an upper limit of one of about 150° F., about 200° F., about 250° F., about 300° F., about 350° F., 400° F., about 450° F., about 500° F., and about 600° F., where a value of the lower limit may be paired with a value of a mathematically compatible upper limit.

The concentration of the nitrite-based compound in the second salt solution and ammonium-based compound in the first salt solution may be selected based on the reaction kinetics of the system, the solubility of the compounds based on a reservoir temperature, a reservoir pressure, or combinations thereof. For example, when the nitrite-based compound relative to ammonium-based compound is at least 1:1 the reaction may occur spontaneously at a more acidic pH, such as equal to or less than about 4.0, or at a temperature equal to or greater than about 60° C.

Enhancing Thermal Energy of a Geothermal Reservoir

In another aspect, embodiments of the present disclosure are directed to methods for enhancing thermal energy production from a geothermal reservoir. FIG. 1 is a block flow diagram for a method of enhancing heat transfer and energy efficiency in a geothermal reservoir according to one or more embodiments. The method includes block 102 in which a carbonated fluid is injected into the geothermal reservoir. The carbonated fluid may be as described above. As one of ordinary skill may appreciate, the carbonated fluid may be prepared at a surface location of the formation or at an off-site location.

In one or more embodiments, the geothermal reservoir temperature is decreased with the injection of the carbonated fluid. In such embodiments, the injection of the carbonated fluid decreases the energy production at the production well of the geothermal reservoir. For example, injecting the carbonated fluid into an injection well of one or more embodiments generates a cold front such that a cooling effect occurs throughout the injection well and penetrates into the geothermal formation.

One or more modelling units of the injection system may predetermine an amount of treatment fluids, such as carbonated fluid, the first salt solution, and the second salt solution, to be delivered downhole, ensure that the $CO_2$-geothermal production process is continuous, or combinations thereof. In such embodiments, the one or more modelling units includes simulation software, such as CMG STARS software. In some embodiments, the amount of treatment fluids to be delivered downhole is determined using upscaled laboratory tests.

Figure 2A:
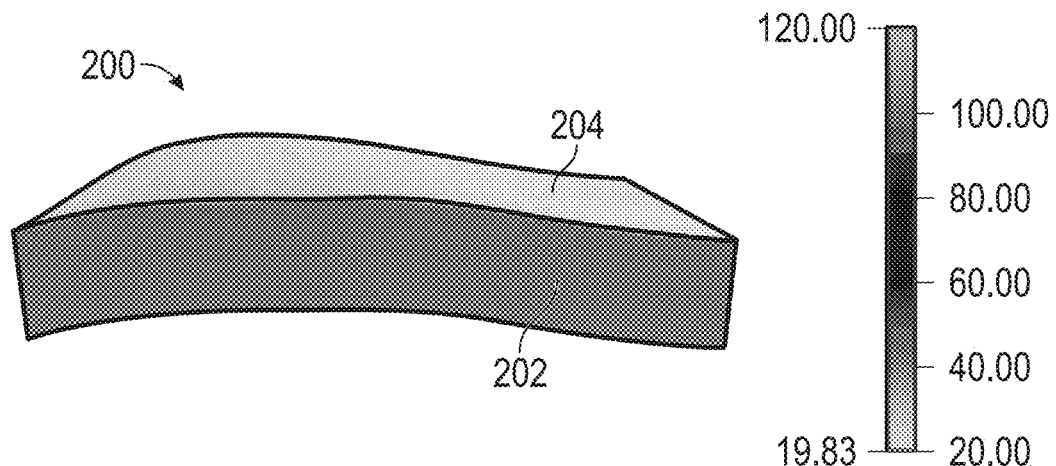
FIGS. 2A-2D are simulated thermal conditions of a reservoir according to the alternating injection of a carbonated fluid and increasing the temperature with a thermogenic reaction in accordance with one or more embodiments.
Figure 2B:
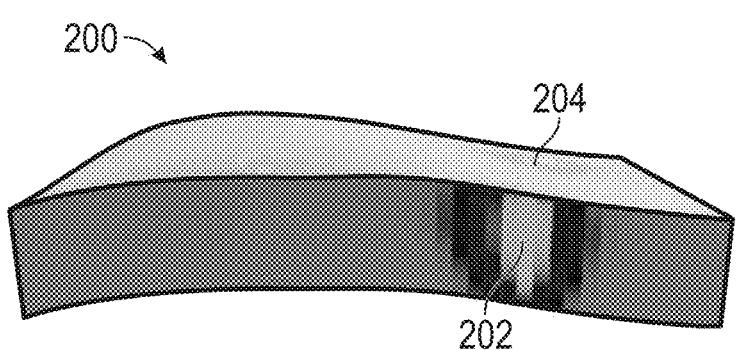
Figure 2B:
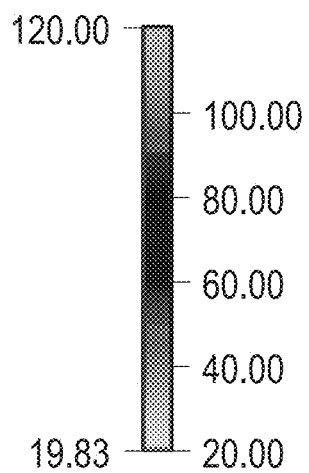

Predetermining the amount of treatment fluids in the geothermal reservoir may be performed prior to injection of the carbonated fluid to model the parameters of a cold front that penetrates (or "invades") the geothermal reservoir. A non-limiting example of a simulation of a method of enhancing heat transfer and energy efficiency in a geothermal reservoir may be performed using to CMG STARS software is shown in FIGS. 2A-2D. As shown in FIG. 2A, the geothermal reservoir 200 includes an injection well 202 with a production well 204, which may have a natural temperature. As shown in FIGS. 2A-2D, the natural temperature of geothermal reservoir 200 is approximately 110° C. The injection of a carbonated fluid, such as supercritical $CO_2$, may then be simulated and the effect of the injection on the temperature of the reservoir 200 is shown in FIG. 2B in which cooling occurs. In one or more embodiments, the carbonated fluid may have a Joule-Thomson cooling effect after injection in the geothermal reservoir as shown in FIG. 2B. For example, the carbonated fluid may have a reservoir cooling effect for a period of time after the injection of the carbonated fluid as the carbonated fluid flows from higher pressure areas to lower pressure areas. In such embodiments, the cooling effect includes a heat exchange from the carbonated fluid to the injection well that occurs via convection, conduction, or both. Notably, a substantial cold ring is mapped proximate to the injection well 202 of FIG. 2B.

In one or more embodiments, the cold front migrates from the injection well throughout the geothermal reservoir, thereby cooling the temperature of the geothermal reservoir. Embodiments in which a cold front gradually invades the porous spaces of a geothermal reservoir proximate to a low-pressure zone, a sink point, a production well, or combinations thereof, can affect the production efficiency of a geothermal reservoir.

Figure 2C:
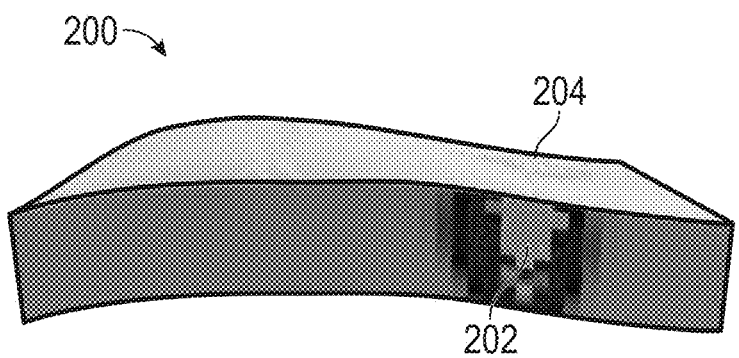
Figure 2C:
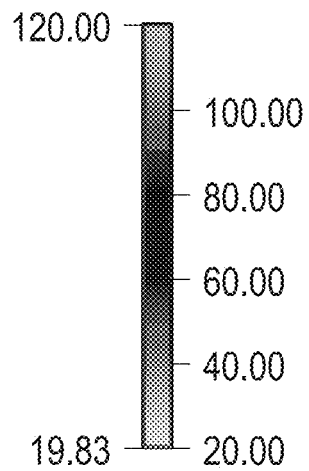
Figure 2D:
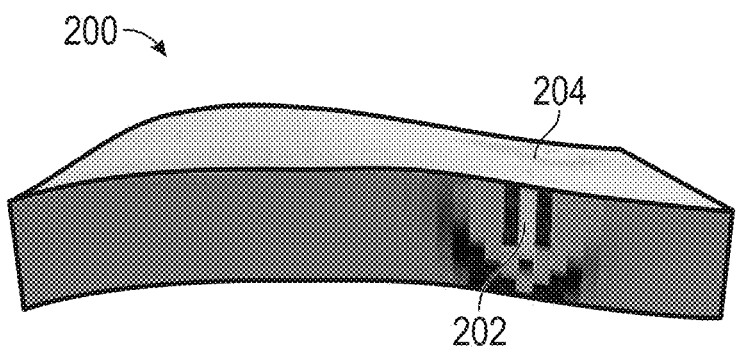
Figure 2D:
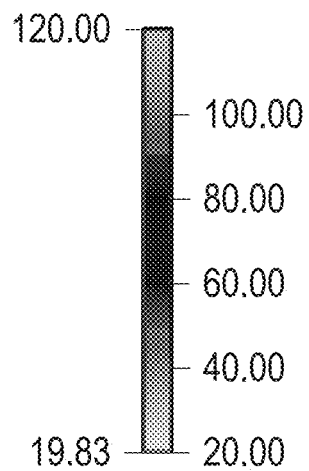

Thermochemical fluid injection may then be simulated, such that generation of a thermogenic reaction is studied in relation to the reservoir and the cold front. As shown in FIG. 2C, the simulated thermogenic reaction may be provided to the injection well of the geothermal reservoir, and the thermal contour map indicates that the cold ring was disrupted by the thermogenic reaction to increase the temperature of the reservoir proximate to the injection well. An additional simulation of supercritical $CO_2$ injection may then be simulated and mapped as shown in FIG. 2D to continue carbonated fluid treatment of the geothermal reservoir. Thus, the simulation results indicate that the temperature of a geothermal reservoir may be controlled to prevent a cold $CO_2$ front from forming, thereby prolonging the lifetime of the geothermal reservoir with the injection of carbonated fluids.

Referring back to FIG. 1, block 104 includes increasing the temperature of the reservoir by reacting a first salt solution with a second salt solution to provide a thermogenic reaction. Injecting one or more treatment fluids after the injection of the carbonated fluid, such as a first salt solution and a second salt solution described above may prevent cold front invasion to the production well of the geothermal reservoir.

Providing the thermogenic reaction may further include providing a first salt solution and a second salt solution in the geothermal reservoir. The first salt solution and the second salt solution may be injected into the geothermal reservoir via one or more fluid transport lines as described above. In such embodiments, heat may be released. The heat may be generated via reaction of thermogenic agents of the first salt solution and the second salt solution. The reaction of the thermogenic agents may occur upon mixing of the first salt solution and second salt solutions downhole.

Amounts of the first salt solution and the second salt solution required for injection to provide the thermogenic reaction may be determined based on the amount of carbonated fluid injected to the injection well, the area in which the cold front has invaded into the geothermal reservoir, or both. In one or more embodiments, the amounts of the first salt solution and second salt solution is determined using mass balance calculations, history matching, reservoir simulations to decide where invasion and permeation of the cold front, or combinations thereof. In one or more embodiments, injection of the first salt solution and the second salt solution is controlled by the reservoir simulation results and based on the cumulative amount the injected carbonated fluid such that cold front invasion of the production well is prevented.

In one or more embodiments, the carbonated fluid, the first salt solution, and the second salt solution are introduced into the subterranean formation sequentially. In one or more embodiments, the carbonated fluid is injected before the injection of the first salt solution and the second salt solution. In some embodiments, the first salt solution and the second salt solution are simultaneously introduced to the geothermal reservoir via separate fluid transport lines as described above such that the solutions are mixed in the formation.

The second salt solution may be reactive with the first salt solution under the conditions in the reservoir after the injecting. In one or more embodiments, the thermogenic reaction is a reaction that occurs between a first salt solution and a second salt solution. A non-limiting example of the thermogenic reaction is shown in Equation (1) using $NH_4Cl$ as the ammonium-based compound and $NaNO_2$ as the nitrite-based compound, which react to generate heat and nitrogen gas. However, it should be understood by a person of ordinary skill in the art that compounds of similar class of reactants may generally react in a similar way as the example reaction schemes shown in Equation (1).

$$NH_4Cl + NaNO_2 + 2H_2O \rightarrow N_2(g) + NaCl + H_2O + Heat \quad (1)$$

The chemical equilibrium and reaction dynamics are affected by at least temperature, pressure, pH, and molar ratios of reactants. In the reaction as provided in Equation (1), the enthalpy of reaction ($\Delta H_{Rx}$) is about −79.95 kcal mol$^{-1}$ (kilocalories per mole) with an irreversible equilibrium constant ($K_{eq}$)=3.9×1071 Pa×mol m$^{-3}$ (pascal-mole per cubic meter) at 25° C. The heat generated from this reaction may be absorbed by the geothermal reservoir having a decreased temperature as a result of the carbonated fluid injection. In one or more embodiments, the heat generated from Equation (1) increases the temperature of the geothermal formation such that energy production from the geothermal reservoir is increased, maintained, or both.

The first salt solution and second salt solution may mix to form a thermogenic mixture in the geothermal reservoir. The thermogenic mixture may be maintained downhole in the formation, allowing the ammonium-based compound and the nitrite-based compound to react such that heat and nitrogen gas are generated from the thermogenic reaction under the conditions in the geothermal reservoir.

In some embodiments, the molar ratio of a nitrite-based compound of the second solution may be optimized such that a thermogenic reaction spontaneously occurs in the geothermal reservoir upon mixing of the first and second salt solutions. For example, the molar ratio of the nitrite-based compound to the ammonium-based compound may be at least 2:1.

In one or more embodiments, the molar ratio of the nitrite-based compound to the ammonium-based compound may be less than 2:1. In such embodiments, the thermogenic reaction of the first salt solution and second salt solutions may be triggered with an external stimulus. The external stimulus (or "trigger") may include a heat source to provide a temperature of at least 60° C., an acidic fluid, or both. In some embodiments, the geothermal reservoir conditions may be the trigger such that a thermogenic reaction of the first salt solution and the second salt solution is triggered by the geothermal reservoir conditions, thereby providing the thermogenic reaction.

The geothermal reservoir conditions may include a pH less than or equal to about 4.0 in a formation in which the temperature is less than 60° C. However, if the pH is too acidic, the concentration of the ammonium containing compound may be diluted and the subsequent resulting nitrogen gas and heat generation may be decreased. Therefore, the conditions may have a sufficiently acidic pH for providing the thermogenic reaction and generation of heat and nitrogen while also preventing the dilution of the ammonium-based compound of the first salt solution.

As described above, the first salt solution may include an acid such that a pH of the thermogenic mixture is about 4.0 or below. The pH of about 4.0 or less of the thermogenic mixture may trigger the thermogenic reaction such that the pH of about 4.0 or less provides the thermogenic reaction. In one or more embodiments, the threshold pH of the treatment mixture is in a range with a lower limit from a pH of about 1.0, a pH of about 1.5, a pH of about 2.0, a pH of about 2.5, a pH of about 3.0, a pH of about 3.5, and a pH of about 4.0 to an upper limit of a pH of about 3.5, a pH of about 4.0, a pH of about 4.5, a pH of about 5.0, a pH of about 5.5, a pH of about 6.0, a pH of about 6.5, or a pH of about 7.0, where a value of the lower limit may be combined with a value of a mathematically compatible upper limit.

In one or more embodiments, the first salt solution and the second salt solution may mix to form an unreacted thermogenic mixture in the formation. An unreacted thermogenic mixture may form within a formation temperature below about 60° C. or less. In one or more embodiments, an unreacted mixture may form when the mixture has a pH of about 4.5 or more in the formation. In such embodiments, an acidic fluid may be injected such that the acidic fluid triggers the thermogenic reaction. The acidic fluid may include an acid as described above.

In one or more embodiments, a mixture of the first salt solution, the second salt solution, the acidic fluid, or combinations thereof, reacts to provide a thermogenic reaction. In one or more embodiments, the unreacted thermogenic mixture reacts to provide a thermogenic reaction upon contact and/or mixing with the acidic fluid. The acidic fluid may include a carbonated fluid and an acid. In some embodiments, the acidic fluid includes a first salt solution, an acid, a carbonated fluid, or combinations thereof.

In one or more embodiments, an acid in the form of carbonic acid present in the carbonated fluid is sufficient to trigger a reaction of Equation (1) as described above. As the acid may be in the form of carbonic acid from the carbonated fluid, the thermogenic reaction may occur immediately upon mixing of the unreacted thermogenic mixture and/or the carbonated fluid when the pH of the mixed fluid is less than or equal to about 4.0. Consequently, the introduction of the first salt solution and the second salt solution into a geothermal formation having the carbonated fluid may trigger the thermogenic reaction between the first salt solution and the second salt solution, thereby providing the thermogenic reaction to generate heat and nitrogen gas.

In one or more embodiments, heat produced from the thermogenic reaction increases a temperature of the geothermal reservoir. The injection of the first salt solution and the second salt solution to provide the thermogenic reaction can thereby prolong the lifespan of a geothermal reservoir. The heat produced from the thermogenic reaction may increase the temperature of the geothermal reservoir that had previously been cooled as a result of the injection of a carbonated fluid. The heat produced from the thermogenic reaction may be absorbed by one or more downhole components of the geothermal reservoir. The injection of the carbonated fluid and thermogenic chemicals may prevent a cold $CO_2$ plume from forming such that the reaction generated from the thermogenic chemicals offsets the temperature decrease from the injected carbonated fluid.

In one or more embodiments, the steps of injecting the carbonated fluid and increasing the temperature of the geothermal reservoir are independently repeated. In particular embodiments, the continuous injection of a carbonated fluid can cause a cold front invasion at the production well of a geothermal treatment system. As such, the steps of injecting the carbonated fluid and increasing the temperature of the geothermal reservoir may be alternated such that the energy production of the geothermal reservoir is increased and/or maintained. In such embodiments, one or more steps of the method 100 are alternated and repeated to prolong the lifespan of a geothermal reservoir.

The method 100 of one or more embodiments prevents cold front invasion to the production well of the geothermal reservoir. The alternating injection of the carbonated fluid and thermogenic chemicals may prevent a cold $CO_2$ plume from forming such that the reaction generated from the thermogenic chemicals offsets the temperature decrease from the injected carbonated fluid. In effect, the carbonated fluid may be passed through the geothermal reservoir, heated by the geothermal reservoir, collected at a production well of the geothermal reservoir, or combinations thereof. In such embodiments, the carbonated fluid collected at the production well of the geothermal reservoir is a geothermally heated carbonated fluid.

Collection of the geothermally heated carbonated fluid may be performed at a surface location of the production well of the reservoir. The collection of the geothermally heated carbonated fluid may include running the geothermally heated carbonated fluid in one or more turbines as described above to generate electricity. The generated electricity may increase based on the amount of treatment fluids injected into the system. In one or more embodiments, the energy released as described by Equation 1 above is scalable by the molar mass of nitrite-based compound and ammonium-based compound. Embodiments of the present disclosure may provide at least one of the following advantages. The methods and systems of one or more embodiments may prevent a cold $CO_2$ plume from invading and cooling one or more production wells in geothermal reservoirs. As such, the energy production of a geothermal reservoir may be increased compared to traditional methods to treat a geothermal reservoir. In such embodiments, the system and methods of enhances electricity production and provides a renewable method to reuse $CO_2$ for the harvesting of energy from geothermal reservoirs.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range. While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method of enhancing heat transfer and energy efficiency in a geothermal reservoir, the method comprising:
    injecting a carbonated fluid to the reservoir, wherein the carbonated fluid injection decreases a temperature of the reservoir;
    injecting a first salt solution and a second salt solution into the reservoir, wherein the second salt solution is reactive with the first salt solution under the conditions in the reservoir after the injecting; and
    increasing the temperature of the reservoir by reacting the first salt solution with the second salt solution to provide heat.

2. The method of claim 1, wherein the conditions are selected from the group consisting of temperature, pH, and combinations thereof.

3. The method of claim 2, wherein the conditions comprise a temperature of about 60° C. or greater.

4. The method of claim 2, wherein the conditions comprise a pH of about 4.0 or less.

5. The method of claim 1, further comprising separately injecting the first salt solution and the second salt solution, wherein the second salt solution is capable of reaction with the first salt solution upon contact under injection conditions and under conditions in the reservoir.

6. The method of claim 1, wherein the first salt solution comprises a first thermogenic agent and the second salt solution comprises a second thermogenic agent, wherein the reacting the first salt solution with second salt solution comprises reacting the first thermogenic agent with the second thermogenic agent.

7. The method of claim 1, further comprising alternating injecting the carbonated fluid and increasing the temperature of the reservoir by injecting the first salt solution and the second salt solution until the reservoir is heated to a target temperature.

8. The method of claim 1, further comprising forming the first salt solution via dissolving an ammonium-based compound in a first aqueous solution, wherein the ammonium-based compound is selected from the group consisting of ammonium chloride, ammonium bromide, ammonium nitrate, ammonium sulfate, ammonium carbonate, ammonium nitrite, ammonium hydroxide, and combinations thereof.

9. The method of claim 8, wherein the ammonium-based compound is ammonium chloride.

10. The method of claim 1, further comprising forming the second salt solution via dissolving a sodium salt in a second aqueous solution, wherein the sodium salt is selected from the group consisting of sodium nitrite, potassium nitrite, sodium hypochlorite, and combinations thereof.

11. The method of claim 10, wherein the sodium salt comprises sodium nitrite.

12. The method of claim 1, further comprising:
    forming an unreacted thermogenic mixture in the reservoir after injecting the first salt solution and the second salt solution into the reservoir, the unreacted thermogenic mixture comprising the first salt solution and the second salt solution; and
    injecting an acidic fluid into the reservoir; and
    mixing the acidic fluid with the unreacted thermogenic mixture, thereby triggering a reaction between the first salt solution and the second salt solution of the unreacted thermogenic mixture.

13. The method of claim 12, wherein mixing the acidic fluid and the unreacted thermogenic mixture decreases a pH of the unreacted thermogenic mixture to a value in a range from 1.0 to 4.0 to trigger a thermogenic reaction.

14. A system for enhancing heat transfer and energy efficiency of a geothermal reservoir, the system comprising:
    an injection system in fluid communication with an injection well, wherein the injection well is in fluid communication with a production well, wherein the injection well and the production well are disposed in the same geologic formation or in different geologic formations; the injection system comprising:
        a carbonated fluid comprising one or more of supercritical $CO_2$ or $CO_2$ dissolved in a carrier fluid,
            wherein the carbonated fluid is capable of introducing a cold plume to the injection well of the geothermal reservoir such that the cold $CO_2$ plume migrates from the injection well throughout the geothermal reservoir and decreases the temperature of the geothermal reservoir;
        a carbonated fluid feed inlet;
        a first salt solution feed inlet; and
        a second salt solution feed inlet; and
    one or more production units configured to harvest thermal energy from a geothermally heated carbonated fluid recovered from the production well,
    wherein a second salt solution is capable of reaction with a first salt solution upon contact under injection conditions and under conditions in the geothermal reservoir to increase a temperature of the geothermal reservoir,
    wherein thermal energy is transferred from the geothermal reservoir to the carbonated fluid to form the geothermally heated carbonated fluid, and
    wherein the injection system is configured to alternate the injection of the carbonated fluid and the first salt solution and second salt solution.

15. The system of claim 14, wherein the first salt solution comprises an ammonium-based compound.

16. The system of claim 14, wherein the second salt solution comprises a sodium salt.

17. The system of claim 14, wherein the carbonated fluid is supercritical $CO_2$.

18. The system of claim 14, wherein the one or more production units comprises one or more turbines at a surface location proximate to the production well and configured to produce electricity from the recovered heated carbonated fluid by running the recovered heated carbonated fluid through the one or more turbines to harvest electricity.

19. The system of claim 14, wherein the system comprises one or more modelling units at a surface location proximate to the injection well configured to simulate the injection of the carbonated fluid, the first salt solution, and the second salt solution in the geothermal reservoir with simulation software.

\* \* \* \* \*